United States Patent [19]
Seibel et al.

[11] 3,903,408
[45] Sept. 2, 1975

[54] ILLUMINATED CIGARETTE LIGHTER FOR A MOTOR VEHICLE

[75] Inventors: Georg Seibel, Dreieichenhain; Jurgen Metzger, Offenbach am Main, both of Germany

[73] Assignee: Schoeller & Co. Elektrotechnische Fabrik, Frankfurt, Germany

[22] Filed: June 18, 1974

[21] Appl. No.: 480,464

[30] Foreign Application Priority Data
June 26, 1973 Germany...................... 7323648[U]

[52] U.S. Cl. .............. 240/2 CL; 219/220; 219/267
[51] Int. Cl. .......................................... F21v 33/00
[58] Field of Search................ 240/2 R, 2 CL, 8.16; 219/201, 202, 220, 267

[56] References Cited
UNITED STATES PATENTS

| | | | |
|---|---|---|---|
| 2,514,171 | 7/1950 | Waltner........................ | 240/2 CL X |
| 2,630,539 | 3/1953 | Sinko et al..................... | 219/220 X |
| 2,692,938 | 10/1954 | Cone.............................. | 240/2 CL |
| 2,701,297 | 2/1955 | Thibault........................ | 240/8.16 X |

*Primary Examiner*—Fred L. Braun
*Attorney, Agent, or Firm*—Toren, McGeady and Stanger

[57] ABSTRACT

A cigarette lighter for an automobile vehicle, or the like, having a plastic frame inserted into a plate in the instrument panel of the vehicle. The socket of the lighter fits into the plastic frame and is illuminated by a lamp contained in the frame. The removable element of the lighter, having an electric heating element, has an asymmetrical cover plate with a transparent lighter symbol therein, that can be illuminated by the lamp when the removable element is inserted into the socket. The light emanating from the lamp can also be used to illuminate the interior of the vehicle by rotating the cover plate so it does not interrupt the beam of light, or by removing the removable element when lighting a cigarette.

8 Claims, 6 Drawing Figures

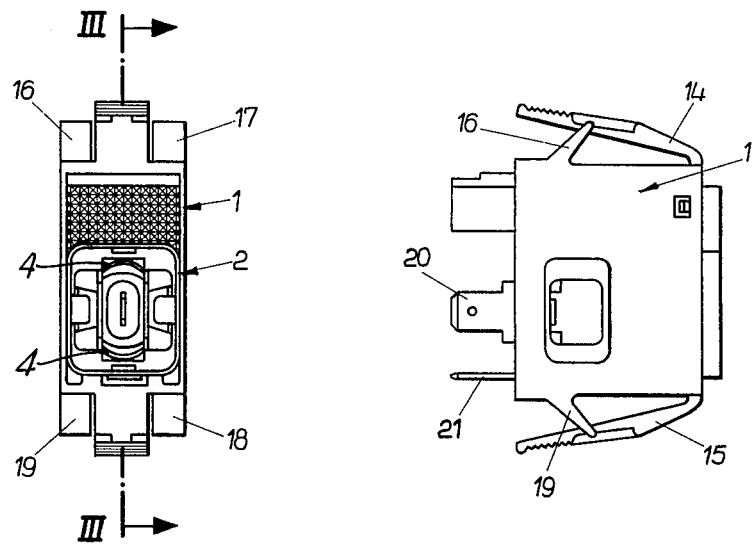
Fig. 2
Fig. 1
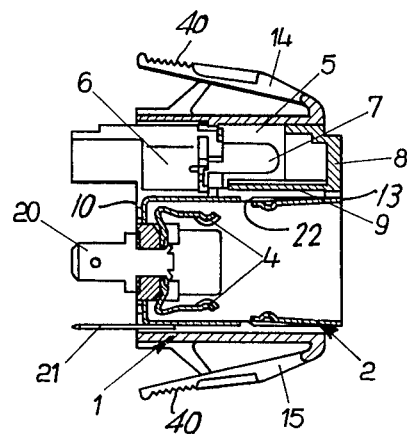
Fig. 3

PATENTED SEP 2 1975 3,903,408
SHEET 2 OF 2
Fig. 4
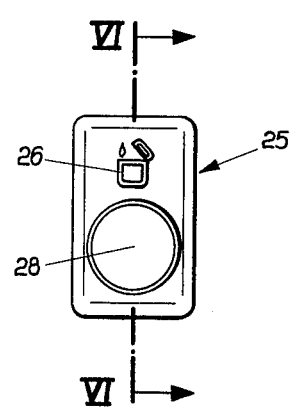
Fig. 5
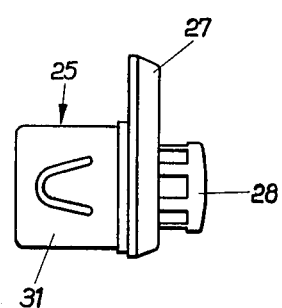
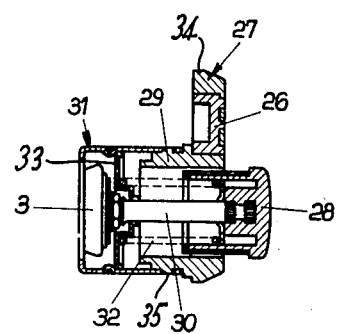
Fig. 6

ILLUMINATED CIGARETTE LIGHTER FOR A MOTOR VEHICLE

SUMMARY OF THE INVENTION

Cigarette lighters for automobiles, trucks, or the like, are well-known in the art. Typically, each lighter comprises a socket inserted into a plate on the instrument panel via a hole or cut-out. The socket has bimetallic grips for holding the removable element of the lighter, and for supplying electric current to the heating element of the removable element. The bimetallic grips along with the heating member are heated by the electric current. Upon reaching a certain temperature the grips are expanded and they release the removable element. These grips have, however, secondary gripping points that prevent the removable element from popping out of the socket onto, for instance, the floor of the vehicle where it could present a fire hazard. The electric current supplied to the heating member is accomplished by a connecting lug at the rear of the socket which is often connected to the "hot" side of the ignition switch via the fuse box. The removable element typically comprises a sleeve in which the heating member, which is connected to a knob, is slidable. The removable element also has a spring which biases the knob and heating member outwardly for urging them away from the bimetallic grips. By pushing on the knob, the heating member, sliding relative to the sleeve, is held by the bimetallic grips and released after a certain heating period by expansion of the grips. The removable element may then be pulled out and used to light a cigarette, or cigar.

The cigarette lighters of the prior art, however, have had some major disadvantages. They did not provide sufficient illumination of the lighter itself so as to facilitate removal and insertion of the removable element. Although the prior art devices have attempted to provide some illumination, they have not provided the luminosity, reliability, and multiplicity of uses of the present invention.

The present invention, which is an improvement over the prior art devices, includes a plastic frame for mounting in the front plate of an instrument panel in a motor vehicle. The frame comprises a plurality of stops spaced about the circumference of the frame for abutment against the rear of the front plate, and a plurality of serrated arms for retaining the frame in the cut-out of the front plate.

The plastic frame, which mounts the socket of the present lighter, also comprises a lamp and lamp socket for illumination by way of a light channel that is closed off at one end by a light distribution plate. This channel and light distribution plate are located to allow the beam of light emanating from the lamp source to irradiate the interior of the automobile, or a transparent cigarette lighter symbol formed in the asymmetrical cover plate of the removable element, depending upon how the user chooses to employ it.

The cigarette lighter symbol is located on that portion of the cover plate that extends outwardly from the knob. The cover plate, and thus the cigarette lighter symbol, can be rotated relative to the rest of the removable element so that the plate is in line with the light source or out of line with it for providing light for the interior of the automobile.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

FIG. 1 is an end view of the plastic frame and socket of the cigarette lighter of the present invention;

FIG. 2 is a plan view of the arrangement shown in FIG. 1;

FIG. 3 is a sectional view of the plastic frame and socket taken along line III-III of FIG. 1;

FIG. 4 is an end view of the removable element of the cigarette lighter of the present invention;

FIG. 5 is a plan view of the same; and

FIG. 6 is a sectional view of the removable element taken along line VI—VI of FIG. 4.

DETAILED DESCRIPTION OF THE INVENTION

In FIGS. 1–6 like reference numerals indicate like parts.

In the drawing, the plastic frame 1, shown in FIGS. 1–3, is made of any suitable material, and has a rectangular opening 10. Equally spaced around the circumference of the frame are a plurality of similar stops 16, 17, 18, 19 which form an acute angle with the circumference, and extend in the direction of the front plate of an instrument panel (not shown) of an automobile or the like.

Provided around the circumference of the frame are a pair of latch arms 14, 15 having serrated ends. The latch arms 14, 15 are spaced 180 degrees from each other to allow secure attachment of the frame 1 to the front plate. The frame 1 is attached to the rear of the front plate of the instrument panel by abutting the stops 16, 17, 18, 19 against the rear of the plate, where the latch arms 14, 15 with serrations 40 at their ends snap into openings of the cut-out provided in the plate for the cigarette lighter.

The plastic frame 1 also comprises a compartment 5 having a lamp 7 plugged into a socket 6. The compartment forms a channel 9 that is closed off at its end facing the front plate by a light distribution plate 8. The channel 9 of the compartment extends only partially over the lamp 7 so that the light emanating from it may enter the socket in the manner described below.

The socket 2, shown in FIGS. 1–3, is mounted inside the opening of the frame 1. The socket 2 comprises a metal sleeve 13, and bimetallic grips 4 (FIG. 3) mounted in the rear of the sleeve. A connecting lug 20 extending from the rear of the socket 2 in a direction away from the front plate of the panel is connected to the bimetallic grips in the conventional manner. The lug 20 is connected in the usual way to a source of electrical current, and thereby supplies the bimetallic grips 4 with electricity. The grips 4 are of the conventional type which expand upon being heated by the electric current, and have a primary and secondary gripping region so that when the heating member of the removable element is heated it will be caught by the secondary gripping region, and will not pop out of the socket. Provided beneath the connecting lug 20, and parallel with it, is a second lug 21 which is secured to the sleeve 13, and is used to ground the metal socket.

The metal sleeve 13 has a hole 22 which cooperates with the compartment of the plastic frame, as shown in FIG. 3, so that light from the lamp 7 will enter the socket via the hole 22, and, consequently, illuminate the socket 2.

The removable element 25 of the lighter, shown in FIGS. 4–6, comprises a metal sleeve 31 which mounts a cover plate 27 at the end farthest from the front plate, and which fits into socket 2 for sliding therein. The cover plate 27 has a shoulder 29 for slidably receiving a knob 28. The knob 28 is connected through a pin 30 to a heating member 3. A return spring 32 has one end secured to a fixed plate 33 of the sleeve 31, and the other end to the inside portion of the knob.

The cover plate 27 is asymmetrical about the center of the sleeve 31. A portion 34 of the cover plate extends outwardly from the sleeve at a 90 degree angle, and has a transparent symbol 26, e.g., a cigarette lighter for identification, formed therein.

The shoulder 29 of the cover plate has a circular rib 35, FIG. 6, that is received by a circular slot in the sleeve 31 so that the cover plate 27 may be rotated relative to the sleeve 31.

OPERATION OF THE DEVICE

The cigarette lighter of the present invention may be used in the conventional manner. When it is desired to light a cigarette or cigar the user presses the knob 28, bringing the heating member 3 into contact with the bimetallic grips 4 in the socket 2 so that the grips hold the heating member. When the removable element is removed, light emanating from the socket and distribution disc 8 helps the user to find the socket and facilitates reinsertion of the removable element. The light also lights up the interior of the automobile to aid in finding the tip of the cigarette or cigar that is to be lit.

While the removable element 31 is in place in the socket, the light emanating from the disc 8 may be utilized in either of two ways. The cover plate 27 can be positioned so that the transparent symbol is opposite the transparent disc 8 to provide a guide to the location of the cigarette lighter. The light source may also be used to illuminate the interior of the vehicle by rotating the cover plate 27 so that the portion 34 does not intersect the beam of light, and, thereby, allows the light source to scatter to the interior of the vehicle.

Thus, the light source of the present invention can be used not only to indicate the location of the cigarette lighter, but also to serve the function of lighting up the inside of the vehicle.

The material forming the plastic frame is a polyamide reinforced with glass fibers. The frame 1 and latch arms 14, 15 are constructed as a unit and, therefore, consist of the same material.

The socket 6 for the lamp 7 is of a conventional type and is connected into the electrical system of the vehicle.

The light distribution disc 8 and the cover plate 27 forming the symbol 26 are formed of acrylic glass.

While a specific embodiment of the invention has been shown and described in detail to illustrate the application of the inventive principles, it will be understood that the invention may be embodied otherwise without departing from such principles.

What is claimed is:

1. A cigarette lighter for use in automobiles or the like which is mounted in a cut-out of the front plate of an instrument panel comprising, in combination, a frame having a sleeve forming an enlarged opening, means spaced circumferentially around said sleeve for mounting said frame in the said cut-out of the front plate, a socket comprising a tubular member telescopically mounted inside said sleeve, bimetallic grips mounted within said member at one end thereof, and a connecting lug connected at one end to said grips for conducting electrical current to said grips, a removable element slidable in said tubular member and having a cover plate and a transparent symbol formed thereon, said frame comprising a laterally extending compartment located interior of said sleeve and including a channel, lighting means mounted in said channel, and a light distribution plate at the end of said channel remote from said lighting means for illuminating said transparent symbol when said symbol intersects the light beam from the plate.

2. A cigarette lighter according to claim 1, wherein said tubular member has a hole formed therein in communication with said channel so that light emanating from said lighting means can light up said socket.

3. The cigarette lighter according to claim 1, wherein said symbol is in the shape of a cigarette lighter.

4. A cigarette lighter according to claim 1, wherein said removable element further comprises a sleeve member longitudinally slidable in said tubular member, a knob slidable in said sleeve member, a heating element for contact with said grips whereby said grips hold said heating element, and means connecting said knob with said heating element so that they may slide axially within said sleeve member as one unit.

5. The cigarette lighter according to claim 4, wherein said removable element further comprises a spring interposed between said knob and said sleeve member for biasing said knob and unit outwardly and axially away from said socket.

6. A cigarette lighter according to claim 4, wherein said sleeve member has a circumferential groove formed therein, said cover plate is asymmetrical about the center of said sleeve member and comprises a shoulder, and means on the circumference of said shoulder coacting with said groove for allowing said cover plate to rotate relative to said sleeve member so that the cover plate with said symbol may be rotated away from said lighting means to light the interior of the vehicle.

7. The cigarette lighter according to claim 1, wherein said means for mounting said frame comprises a plurality of circumferentially arranged, angularly spaced arms positioned around said sleeve and having serrated ends for gripping the cut-out of the front plate.

8. The cigarette lighter according to claim 7, wherein said means for mounting said frame further comprises a plurality of circumferentially arranged, equally spaced stops positioned around said sleeve, and said stops are inclined upwardly from said sleeve in the direction of the front plate.

* * * * *